United States Patent
Chien et al.

(10) Patent No.: US 8,218,867 B2
(45) Date of Patent: Jul. 10, 2012

(54) COMPENSATION METHOD FOR REMOVING IMAGE NOISE

(75) Inventors: Chung-Fang Chien, Taipei (TW); Che-Hung Lin, Nantou County (TW)

(73) Assignee: Altek Corporation, Hsinchu (TW)

( * ) Notice: Subject to any disclaimer, the term of this patent is extended or adjusted under 35 U.S.C. 154(b) by 532 days.

(21) Appl. No.: 12/482,706

(22) Filed: Jun. 11, 2009

(65) Prior Publication Data

US 2010/0246949 A1 Sep. 30, 2010

(30) Foreign Application Priority Data

Mar. 25, 2009 (TW) .............................. 98109804 A

(51) Int. Cl.
G06K 9/00 (2006.01)
G06K 9/40 (2006.01)
(52) U.S. Cl. ..................... 382/167; 382/162; 382/254
(58) Field of Classification Search .................. 382/162, 382/167, 254
See application file for complete search history.

(56) References Cited

U.S. PATENT DOCUMENTS

| 6,476,865 | B1* | 11/2002 | Gindele et al. ............... 348/277 |
| 2002/0167602 | A1* | 11/2002 | Nguyen ........................ 348/280 |
| 2005/0200733 | A1* | 9/2005 | Malvar .......................... 348/272 |
| 2009/0066821 | A1* | 3/2009 | Achong et al. ................ 348/273 |

OTHER PUBLICATIONS

Kimmel, R.—"Demosaicing: Image Reconstruction from Color CCD Sample"—IEEE 1999, pp. 1221-1228.*
Malvar, H.—"High-Quality Linear Interpolation for Demosaicing of Bayer-Patterned Color Images"—International Conference of Acoustic, Speech and Signal Processing—May 2004, pp. 1-4.*

* cited by examiner

Primary Examiner — Bernard Krasnic
(74) Attorney, Agent, or Firm — Morris Manning & Martin LLP; Tim Tingkang Xia, Esq.

(57) ABSTRACT

A compensation method for removing an image noise is applicable to compensate for noises generated by Bayer pattern color interpolation. The compensation method includes the following steps selecting a partial region in the Bayer pattern to set a selection region; selecting a plurality of color units from the selection region one by one, in which each of the color units at least includes a green pixel, a red pixel, and a blue pixel; sequentially performing a color weight adjustment on the green pixel, the red pixel, and the blue pixel; and compensating for the pixel in the selection region according to each color weight, so as to generate a recovered pixel.

3 Claims, 7 Drawing Sheets

COMPENSATION METHOD FOR REMOVING IMAGE NOISE

CROSS-REFERENCE TO RELATED APPLICATIONS

This non-provisional application claims priority under 35 U.S.C. §119(a) on Patent Application No(s). 098109804 filed in Taiwan, R.O.C. on Mar. 25, 2009 the entire contents of which are hereby incorporated by reference.

BACKGROUND OF THE INVENTION

1. Field of the Invention

The present invention relates to an image compensation method and more particularly to an image noise compensation method applicable to a digital image with noises generated by Bayer pattern color processing.

2. Related Art

In a photosensitive element, an array formed by millions of photosensitive units (or pixels) covers a surface of a transducer. Once the photosensitive element receives lights, accumulated charges on the pixel array of the entire photosensitive element are read from one end of the photosensitive element. The accumulated charges are quantified by an analog front end (AFE) chip or a photosensitive processor.

In order to precisely present a color image, each pixel position on the transducer requires three color samples, which are normally three primary colors of red, green, and blue (RGB). However, if three layers of color photosensitive elements are disposed on the same pixel position, the cost of a digital camera may be greatly increased. Therefore, a process of using a color filter array (CFA) to receive lights for the color pixels has been proposed. Currently, the most commonly used CFA is a Bayer pattern.

FIG. 1 is a schematic view of a Bayer pattern. Referring to FIG. 1, a Bayer pattern 100 utilizes the principle that human eyes are more sensitive in recognizing green than in recognizing red or blue. Therefore, in a CFA with the Bayer pattern 100, the number of green filters is twice of that of blue filters or red filters, such that each four pixels form one unit. The arrangement sequences of the filters are as follows: in the first row, red filters and green filters are arranged alternately; and in the next row, green filters and blue filters are arranged alternately.

Finally, a digital camera processor performs a color interpolation according to the quantity of lights received by each pixel. Table 1 shows a partial list of a filter array of pixels.

TABLE 1

| $G_1$ | $R_2$ | $G_3$ | $R_4$ |
|---|---|---|---|
| $B_5$ | $G_6$ | $B_7$ | $G_8$ |
| $G_9$ | $R_{10}$ | $G_{11}$ | $R_{12}$ |
| $B_{13}$ | $G_{14}$ | $B_{15}$ | $G_{16}$ |

For example, the interpolation operation is an interpolation of green pixels at positions of blue pixels and red pixels. Referring to Table 1, as four surrounding pixels all have real green pixels, a missing green pixel can be recovered through interpolation by using the surrounding green pixels. Likewise, a missing red pixel or a missing blue pixel can also be recovered through interpolation by using the same color in neighboring regions thereof.

$$G'_7 = (G_3 + G_6 + G_8 + G_{11})/4$$

$$R'_7 = (R_2 + R_4 + R_{10} + R_{12})/4$$

$$B'_6 = (B_5 + B_7)/2$$

Here, G, R, and B respectively represent a real green pixel, a real red pixel, and a real blue pixel, and G', R', and B' respectively represent a green pixel value, a red pixel value, and a blue pixel value obtained through interpolation.

After the colors of the above pixels are reconfigured, color correction values of all pixels in the Bayer pattern 100 may be obtained. After compensation, Table 2 is obtained as follows, which shows a list of colors of each pixel after compensation.

TABLE 2

| $G_1 R'_1 B'_1$ | $G'_2 R_2 B'_2$ | $G_3 R'_3 B'_3$ | $G'_4 R_4 B'_4$ |
|---|---|---|---|
| $G'_5 R'_5 B_5$ | $G_6 R'_6 B'_6$ | $G'_7 R'_7 B_7$ | $G_8 R'_8 B'_8$ |
| $G_9 R'_9 B'_9$ | $G'_{10} R_{10} B'_{10}$ | $G_{11} R'_{11} B'_{11}$ | $G'_{12} R_{12} B'_{12}$ |
| $G'_{13} R'_{13} B_{13}$ | $G_{14} R'_{14} B'_{14}$ | $G'_{15} R'_{15} B_{15}$ | $G_{16} R'_{16} B'_{16}$ |

However, if merely a single color is used for compensation and correction, distant color pixels may severely affect the current color pixel. In other words, as not all pixels of the Bayer pattern 100 in the digital image are similar, neighboring pixels with significant differences may affect an overall average. At this time, noises are generated in the digital image.

If a noise removal process is performed on each compensated pixel, the effect of the noise removal is rather limited, as the pixel has been compensated by other colors.

SUMMARY OF THE INVENTION

Accordingly, the present invention is a compensation method for removing an image noise, which is adapted to compensate for noises generated by Bayer pattern color interpolation.

In order to achieve the above objective, the present invention provides a compensation method for removing an image noise, which comprises the following steps: selecting a partial region in a Bayer pattern to set a selection region; selecting a plurality of color units from the selection region one by one, in which each of the color units at least comprises a green pixel, a red pixel, and a blue pixel; performing a first color weight adjustment on the green pixel, so as to generate a recovered green filter parameter; performing a second color weight adjustment on the red pixel by using the recovered green filter parameter, so as to generate a recovered red filter parameter; performing a third color weight adjustment on the blue pixel by using the recovered green filter parameter and the recovered red filter parameter, so as to generate a recovered blue filter parameter; and performing a color compensation method on a pixel at a corresponding position according to the recovered green filter parameter, the recovered red filter parameter, and the recovered blue filter parameter.

The first color weight adjustment is performed on the green pixel according to the following equation, so as to generate the recovered green filter parameter:

$$G_{recovery} = Filter_g(G)$$

The second color weight adjustment is performed on the red pixel according to the following equation and the recovered green filter parameter, so as to generate the recovered red filter parameter:

$$R_{recovery} = Filter_r(R, G_{recovery})$$

The third color weight adjustment is performed on the blue pixel according to the following equation, the recovered green filter parameter, and the recovered red filter parameter, so as to generate the recovered blue filter parameter:

$$B_{recovery} = Filter_b(B, R_{recovery}, G_{recovery})$$

The present invention provides a color pixel compensation method applicable to a raw image data received by an image sensor. Through the present invention, an interpolation calculation is performed on each color pixel by using neighboring color pixels thereof. Thus, for such a color pixel, the reference is not only made to pixels of the same color, so that the noises in the digital image caused by the conventional color interpolation are reduced.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
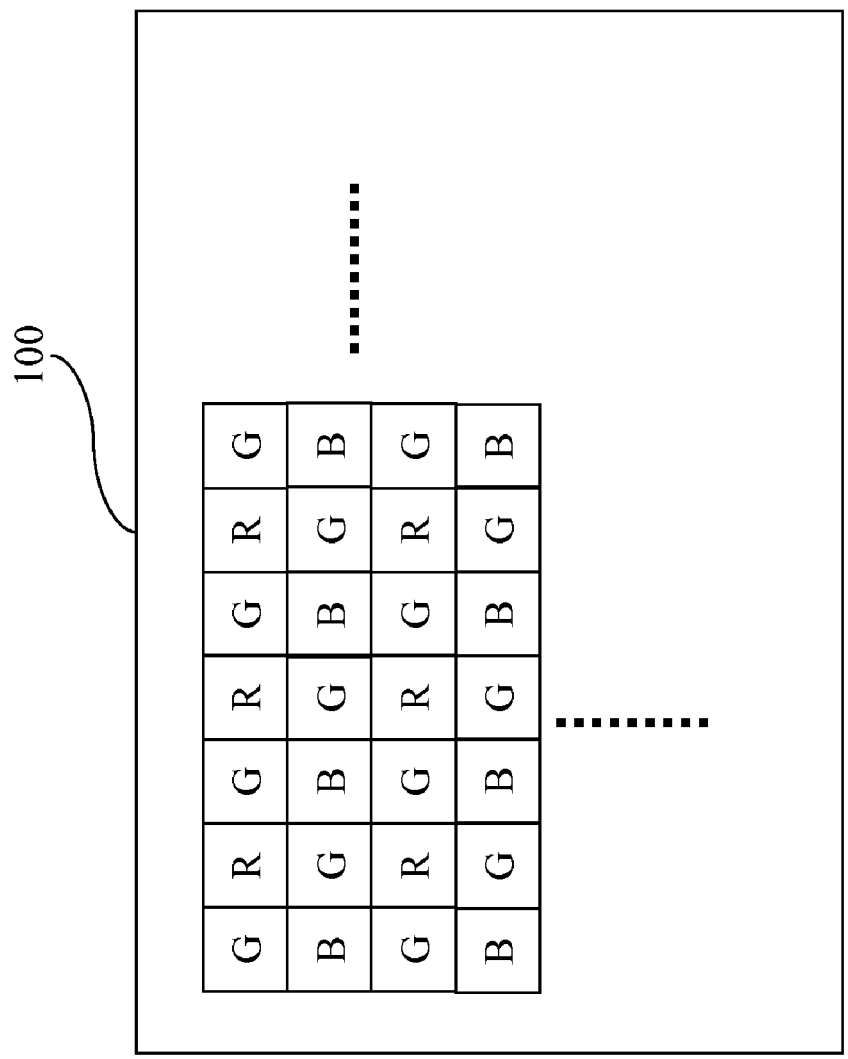
FIG. 1 is a schematic view of a Bayer pattern in the prior art.
Figure 2:
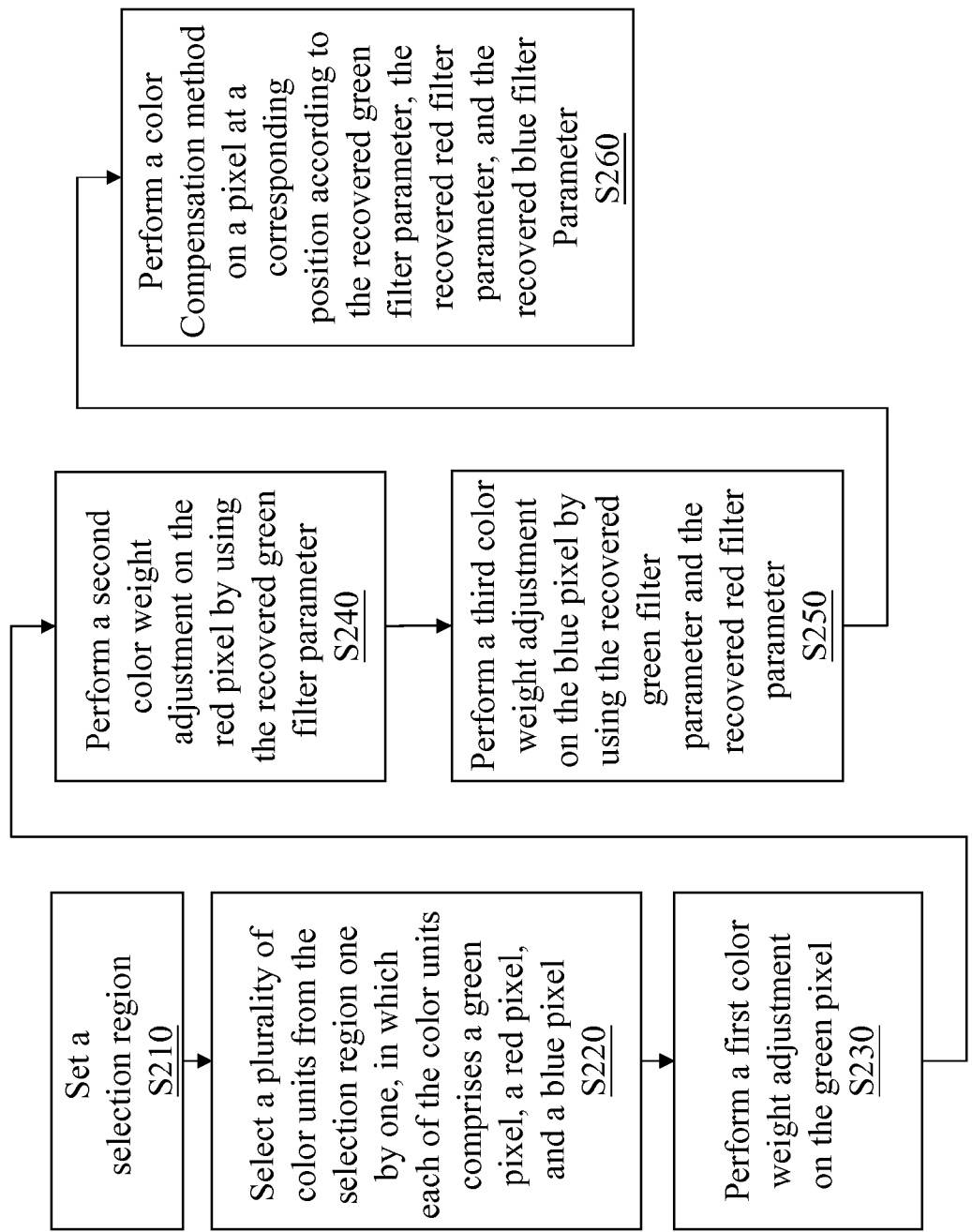
FIG. 2 is a schematic flow chart of operations of the present invention.
Figure 3:
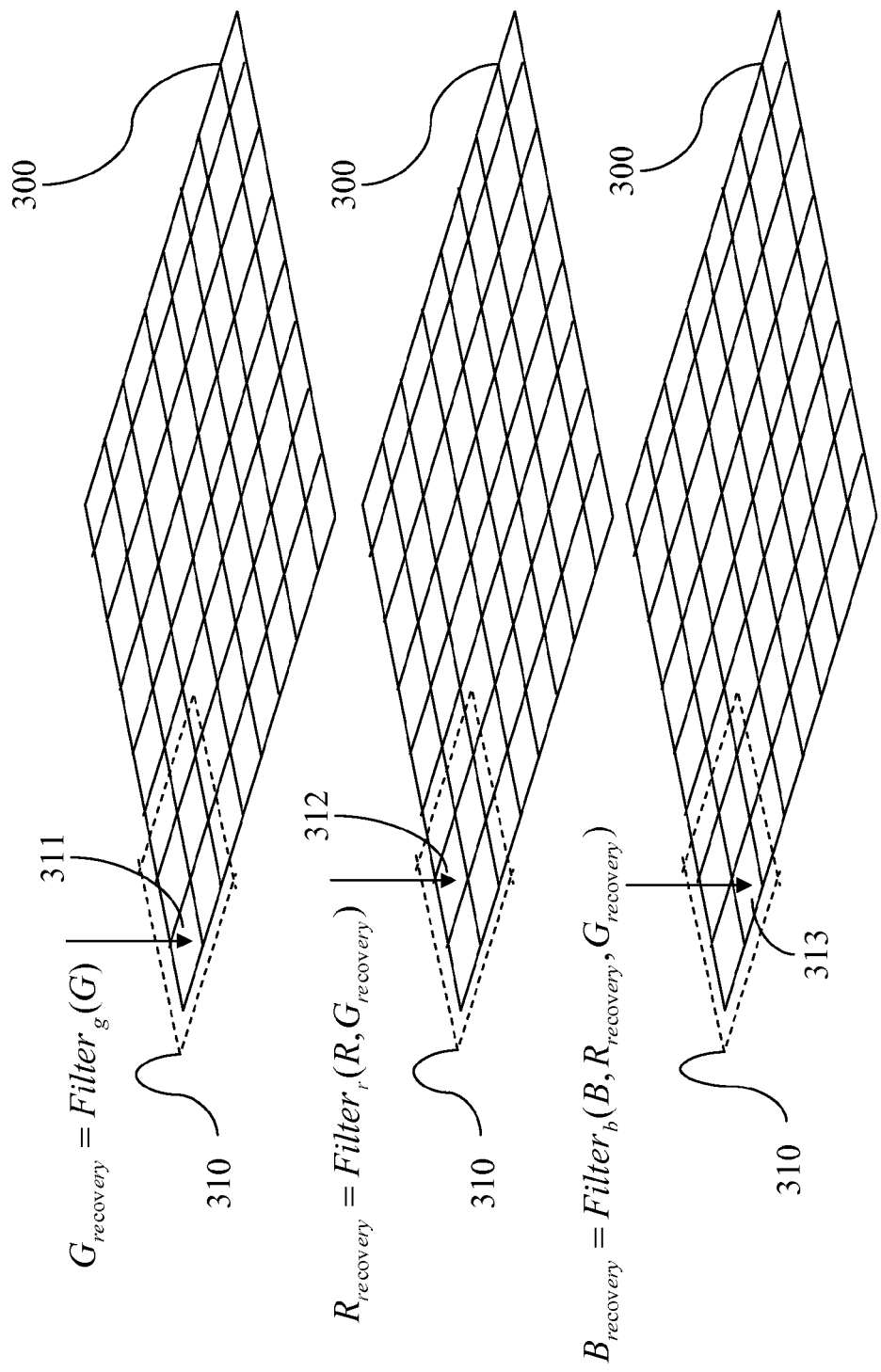
FIG. 3 is a schematic view of a color weight adjustment according to the present invention.

FIG. 2 is a schematic flow chart of operations of the present invention. Referring to FIG. 2, the compensation method of the present invention comprises the following steps. A selection region is set (Step S210), so as to select a partial region 310 in the Bayer pattern as shown in FIG. 3. The selection region is an m*n pixel array, and at least comprises one of the color units. Each of the color units comprises a green pixel, a red pixel, and a blue pixel.

A plurality of color units is selected from the selection region (Step S220). Each of the color units comprises a green pixel, a red pixel, and a blue pixel. According to each type of color pixels in a Bayer pattern 300, the signal-to-noise ratios of corresponding color pixels are calculated, namely, a green pixel signal-to-noise ratio, a red pixel signal-to-noise ratio, and a blue pixel signal-to-noise ratio. The signal-to-noise ratio refers to a ratio of a power of signal to a power of noise. Equation 1 is an equation for calculating the signal-to-noise ratio.

$$SNR = \frac{P_{signal}}{P_{noise}} \propto 10\log_{10}\frac{\sum_{j=1}^{M}\sum_{i=1}^{N}X_{ij}^2}{\sum_{j=1}^{M}\sum_{i=1}^{N}(X_{ij}-Z_{ij})^2} \quad \text{Equation 1}$$

$P_{signal}$ represents a power of signal; $P_{noise}$ represents a power of noise; a digital image is an M*N pixel array; $X_{ij}$ represents an ideal signal at a position (i,j) in the image that is not interfered; and $Z_{ij}$ represents a signal that is actually obtained at the position. In general, the higher the signal-to-noise ratio is, the clearer the signal is. For a digital image, the higher the signal-to-noise ratio is, the higher the image quality is.

A first color weight adjustment is performed on the green pixel (Step S230), so as to generate a recovered green filter parameter. The first color weight adjustment is performed on the green pixel according to the following Equation 2.

$$G_{recovery}=\text{Filter}_g(G) \quad \text{Equation 2}$$

$G_{recovery}$ represents the recovered green filter parameter; and $\text{Filter}_g$ represents a green-pass filter.

Then, a second color weight adjustment is performed on the red pixel by using the recovered green filter parameter, so as to generate a recovered red filter parameter (Step S240). The second color weight adjustment is performed on the red pixel according to the following Equation 3 and the recovered green filter parameter obtained using Equation 2.

$$R_{recovery}=\text{Filter}_r(R,G_{recovery}) \quad \text{Equation 3}$$

$R_{recovery}$ represents the recovered red filter parameter; and $\text{Filter}_r$ represents a red-pass filter.

A third color weight adjustment is performed on the blue pixel by using the recovered green filter parameter and the recovered red filter parameter, so as to generate a recovered blue filter parameter (Step S250). The third color weight adjustment is performed on the blue pixel according to the following Equation 4, the recovered green filter parameter, and the recovered red filter parameter.

$$B_{recovery}=\text{Filter}_b(B,R_{recovery},G_{recovery}) \quad \text{Equation 4}$$

$B_{recovery}$ represents the recovered blue filter parameter; and $\text{Filter}_b$ represents a blue-pass filter.

Finally, a color compensation method is performed on a pixel at a corresponding position according to the recovered green filter parameter $G_{recovery}$, the recovered red filter parameter $R_{recovery}$, and the recovered blue filter parameter $B_{recovery}$ (Step S260). FIG. 3 is a schematic view of a color weight adjustment according to the present invention. Each color pass filter may directly modify a pixel value through a spatial-domain manner (for example, a mask), or filter out a corresponding frequency from the digital image through a frequency-domain manner (for example, fast Fourier transform (FFT), discrete cosine transform (DCT), or discrete wavelet transformation (DWT)). As the data volume occupied by green pixels 311 in the Bayer pattern 300 is twice of that of red pixels 312 and blue pixels 313, a signal-to-noise ratio of the green pixels 311 is higher than that of the red pixels 312 or the blue pixels 313. Therefore, the green pixels 311 may be used to adjust the weight values of the red pixels 312 and the blue pixels 313.

Figure 4A:
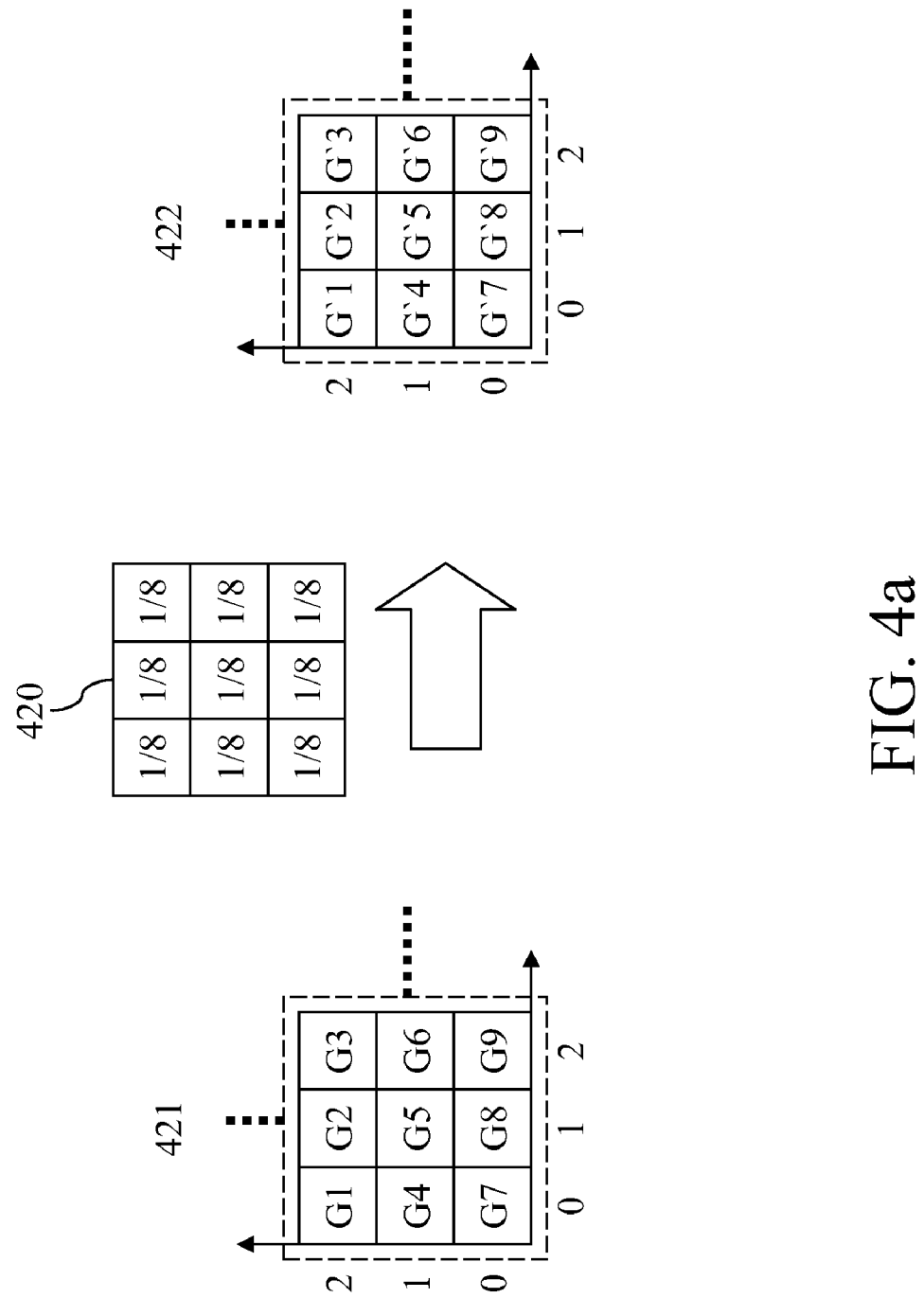
FIG. 4a is a schematic view of a compensation for a green pixel.
Figure 4B:
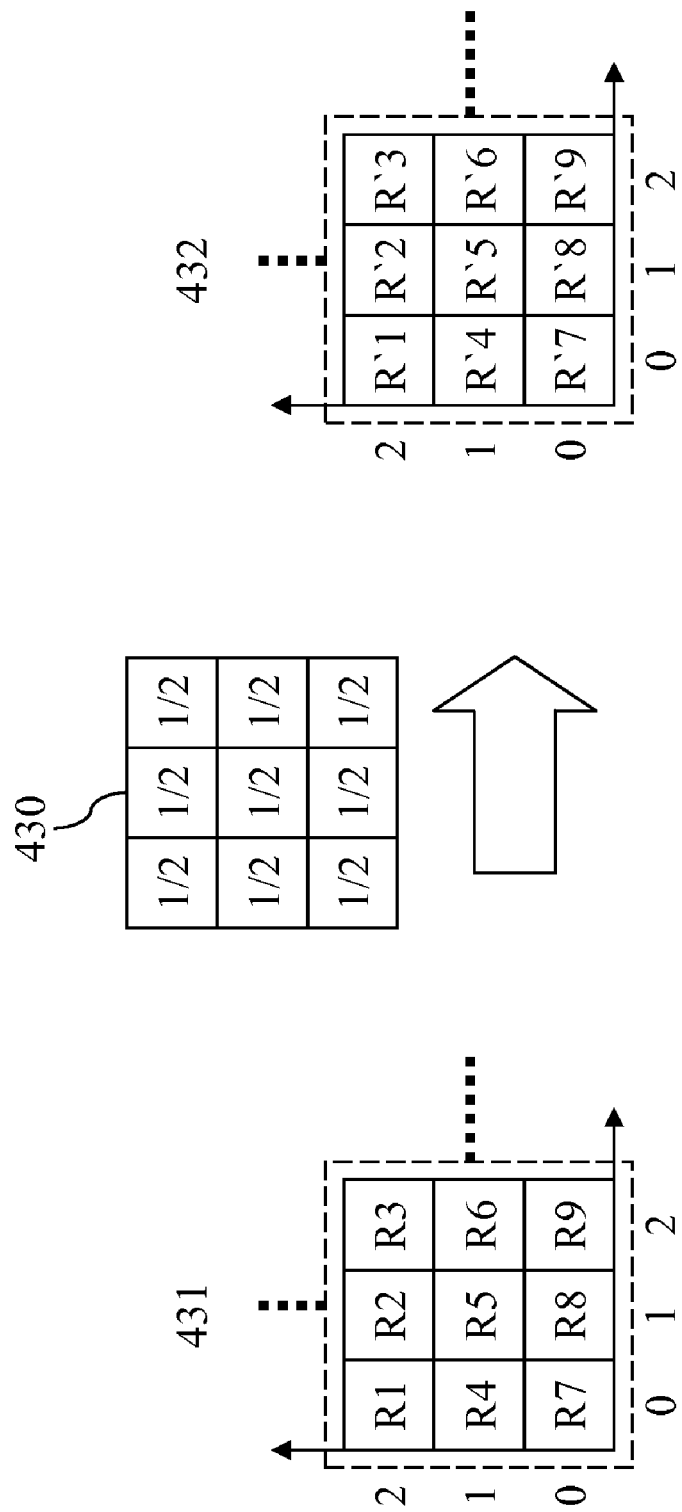
FIG. 4b is a schematic view of a compensation for a red pixel.
Figure 4C:
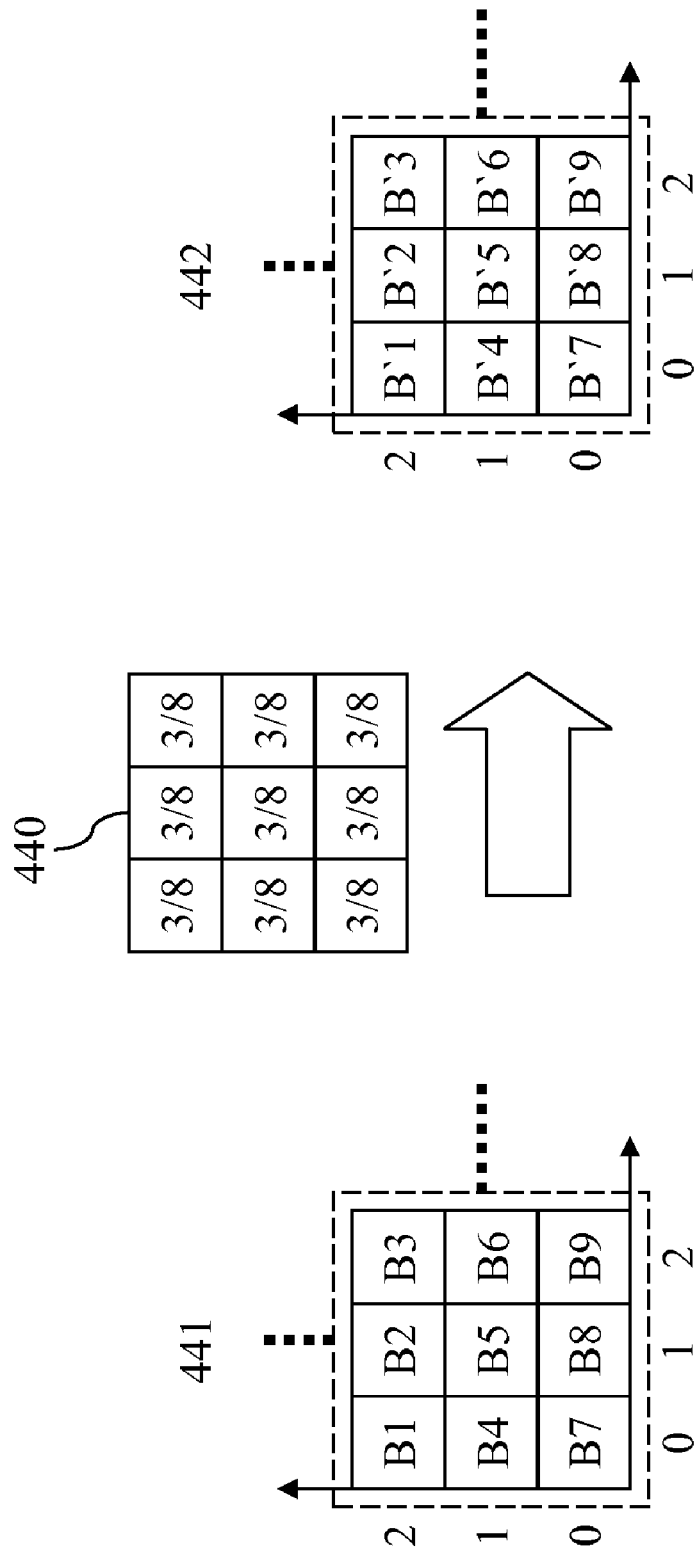
FIG. 4c is a schematic view of a compensation for a blue pixel.

FIGS. 4a, 4b, and 4c are respectively schematic views of a compensation for each color pixel according to the present invention. Here, for the purpose of clearly demonstrating the present invention, a smoothing mask is taken as an embodiment.

The noises in the image are removed by using three smoothing masks respectively. Each mask has an array size of 3*3, and array elements are used to adjust pixel values at corresponding positions. The three smoothing masks are respectively a green smoothing mask 420, a red smoothing mask 430, and a blue smoothing mask 440. A sum of the green smoothing mask 420, the red smoothing mask 430, and the blue smoothing mask 440 is 1.

Plane coordinates on the left of FIG. 4a represent a green pixel array 421, and a selection region is used to select a portion of the green pixel array 421. Then, a green smoothing mask 420 with a corresponding weight is generated according to the result of the above Equation 2. Then, a smoothing calculation is performed on the original green pixel array 421 using the green smoothing mask 420. Finally, a compensated green pixel array 422 on the right of FIG. 4a is generated.

Figure 4D:
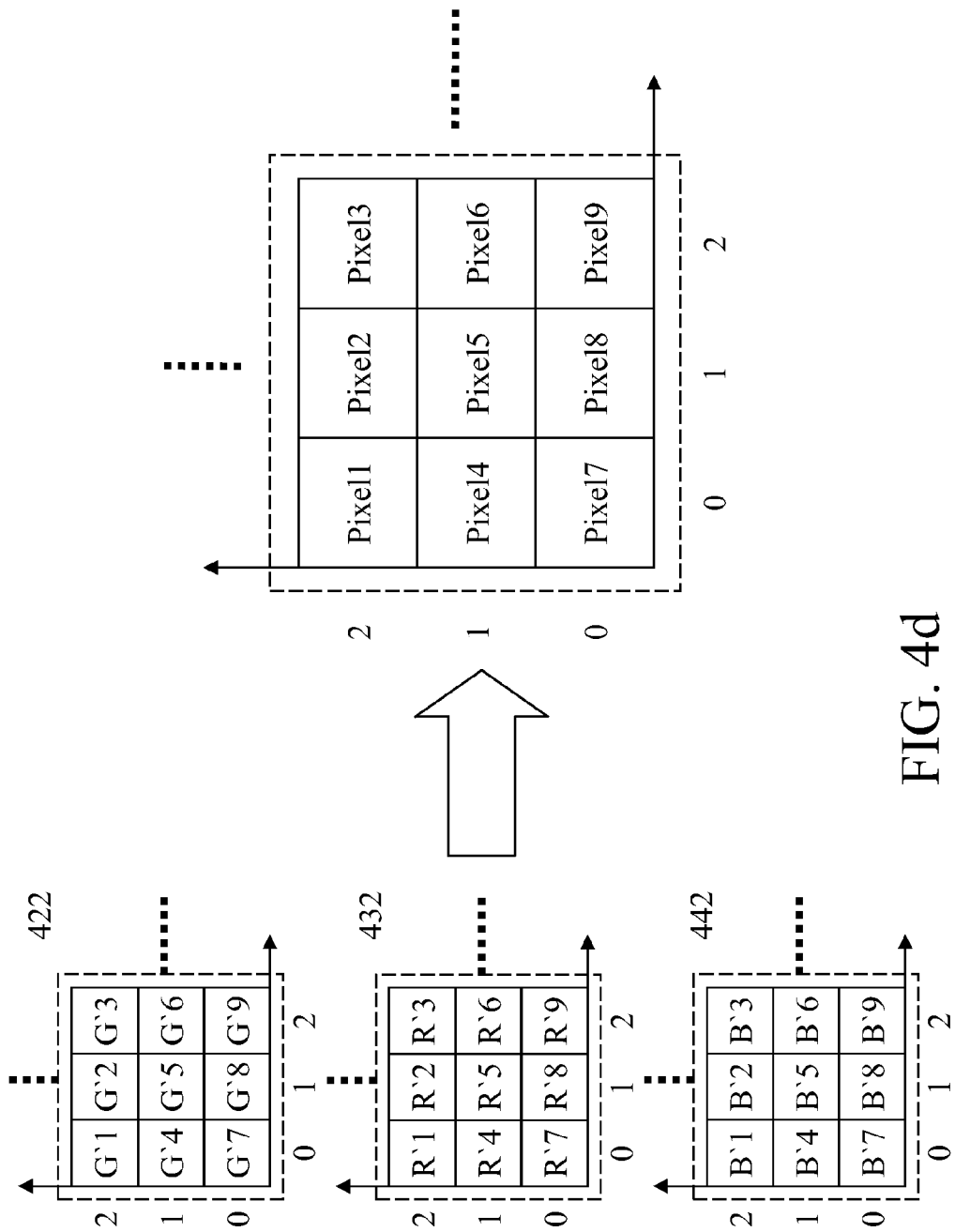
FIG. 4d is a schematic view of color pixel arrays.

Then, the red smoothing mask 430 is generated according to the compensated green pixel array 422, the signal-to-noise ratio of the green pixels 311, and the signal-to-noise ratio of the red pixels 312. Plane coordinates on the left of FIG. 4b represent a red pixel array 431. A smoothing process of the red pixel array 431 by using a smoothing mask is similar to that of the green pixels 311, so the details thereof are not described herein again. The blue smoothing mask 440 is generated according to the compensated green pixel array 422, the signal-to-noise ratio of the green pixels 311, a compensated red pixel array 432, and the signal-to-noise ratio of the red pixels 312. Then, a color compensation method is performed on the blue pixels 313 by using the blue smoothing mask 440. Plane coordinates on the left of FIG. 4c represent a blue pixel array 441, and a compensated blue pixel array 442 is generated according to the obtained blue smoothing mask 440 with reference to the signal-to-noise ratio of the green pixels 311, the signal-to-noise ratio of the red pixels 312, and the signal-to-noise ratio of the blue pixels 313. FIG. 4d is a schematic view of color pixel arrays. The color compensation is respectively performed on each color pixel array by using corresponding smoothing masks, so as to reduce the generation of noise pixels.

The present invention provides a color pixel compensation method applicable to a raw image data received by an image sensor. Through the present invention, an interpolation calculation is performed on each color pixel by using neighboring color pixels thereof. Thus, for such a color pixel, the reference is not only made to pixels of the same color, and moreover, the weight adjustment is performed on the current color pixel by using other color pixels, thus reducing the noises in the digital image caused by conventional color interpolation.

What is claimed is:

1. A compensation method for removing an image noise, for compensating for noises generated by Bayer pattern color interpolation, the compensation method comprising:

selecting a partial region in a Bayer pattern to set a selection region;

selecting a plurality of color units from the selection region one by one, wherein each of the color units at least comprises a green pixel, a red pixel, and a blue pixel;

performing a first color weight adjustment on the green pixel, so as to generate a recovered green filter parameter by a computer processor, wherein the first color weight adjustment is performed on the green pixel (G) according to a following equation, so as to generate the recovered green filter parameter:

$G_{recovery} = Filter_g(G);$ performing a second color weight adjustment on the red pixel by using the recovered green filter parameter, so as to generate a recovered red filter parameter by the computer processor, wherein the second color weight adjustment is performed on the red pixel (R) according to a following equation and the recovered green filter parameter, so as to generate the recovered red filter parameter:

$R_{recovery} = Filter_r(R, G_{recovery});$ performing a third color weight adjustment on the blue pixel by using the recovered green filter parameter and the recovered red filter parameter, so as to generate a recovered blue filter parameter by the computer processor, wherein the third color weight adjustment is performed on the blue pixel (B) according to a following equation, the recovered green filter parameter, and the recovered red filter parameter, so as to generate the recovered blue filter parameter:

$B_{recovery} = Filter_b(B, R_{recovery}, G_{recovery});$ performing a color compensation method on a pixel at a corresponding position according to the recovered green filter parameter, the recovered red filter parameter, and the recovered blue filter parameter by the computer processor; and in the above equations, $G_{recovery}$, $R_{recovery}$, and $B_{recovery}$ respectively represent the recovered green filter parameter, the recovered red filter parameter, and the recovered blue filter parameter, and $Filter_g$, $Filter_r$, and $Filter_b$ respectively represent a green-pass filter, a red-pass filter, and a blue-pass filter.

2. The compensation method for removing an image noise according to claim 1, wherein the selection region is an m*n pixel array, and the selection region at least comprises one of the color units.

3. The compensation method for removing an image noise according to claim 1, wherein after the step of selecting the color units from the selection region one by one, the method further comprises: obtaining a green pixel signal-to-noise ratio, a red pixel signal-to-noise ratio, and a blue pixel signal-to-noise ratio of the Bayer pattern.

* * * * *